(12) United States Patent
Hashizume et al.

(10) Patent No.: US 10,101,645 B2
(45) Date of Patent: Oct. 16, 2018

(54) WAVELENGTH CONVERSION ELEMENT, LIGHT SOURCE DEVICE, AND PROJECTOR

(71) Applicant: SEIKO EPSON CORPORATION, Tokyo (JP)

(72) Inventors: Toshiaki Hashizume, Okaya (JP); Kunihiko Takagi, Okaya (JP); Tetsuo Shimizu, Matsumoto (JP); Osamu Arakawa, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/667,905

(22) Filed: Aug. 3, 2017

(65) Prior Publication Data

US 2018/0052386 A1 Feb. 22, 2018

(30) Foreign Application Priority Data

Aug. 20, 2016 (JP) ................. 2016-161583

(51) Int. Cl.
    G03B 21/20 (2006.01)
    G03B 21/00 (2006.01)
    G03B 21/16 (2006.01)

(52) U.S. Cl.
    CPC ......... *G03B 21/204* (2013.01); *G03B 21/006* (2013.01); *G03B 21/16* (2013.01); *G03B 21/2013* (2013.01); *G03B 21/2066* (2013.01)

(58) Field of Classification Search
    CPC .... G03B 21/006; G03B 21/28; G03B 21/204; G03B 21/2013; G03B 21/2066; H01J 29/20; H01J 29/187; H01J 29/327
    See application file for complete search history.

(56) References Cited

U.S. PATENT DOCUMENTS

| | | | |
|---|---|---|---|
| 2001/0019240 A1* | 9/2001 | Takahashi | G02F 1/133617 313/483 |
| 2006/0071225 A1* | 4/2006 | Beeson | H01L 33/0079 257/98 |
| 2009/0086475 A1 | 4/2009 | Caruso et al. | |
| 2011/0149549 A1 | 6/2011 | Miyake | |
| 2011/0175117 A1* | 7/2011 | Jagt | H01L 33/44 257/88 |
| 2011/0310362 A1* | 12/2011 | Komatsu | G03B 21/204 353/85 |
| 2013/0113011 A1 | 5/2013 | Dutta | |
| 2014/0111775 A1* | 4/2014 | Nishikawa | G03B 21/2013 353/31 |
| 2016/0147136 A1 | 5/2016 | Nojima | |

FOREIGN PATENT DOCUMENTS

JP  2011-129354 A  6/2011
JP  2016-099558 A  5/2016

* cited by examiner

*Primary Examiner* — Sultan Chowdhury
(74) *Attorney, Agent, or Firm* — Oliff PLC

(57) ABSTRACT

A wavelength conversion element includes a base material and a phosphor layer that contains a phosphor emitting fluorescence upon incidence of excitation light and is provided on the base material, in which the phosphor layer includes a first surface on which excitation light (blue light) is incident and a second surface facing the base material, and a plurality of regions with different absorption coefficients of the excitation light between the first surface and the second surface.

19 Claims, 12 Drawing Sheets

WAVELENGTH CONVERSION ELEMENT, LIGHT SOURCE DEVICE, AND PROJECTOR

BACKGROUND

1. Technical Field

The present invention relates to a wavelength conversion element, a light source device, and a projector.

2. Related Art

In the related art, a projector which modulates light emitted from a light source device according to image information and projects an image on a projection surface such as a screen is known. In recent years, a technique using a phosphor in the light source device for the projector has been proposed (for example, see JP-A-2011-129354).

The light source device described in Japanese Laid-open Patent Publication No. 2011-129354 includes a solid light source, a phosphor layer including a phosphor that is excited by excitation light from the solid light source and emits fluorescence having a wavelength longer than the emitted wavelength of the solid light source, and a heat dissipating substrate provided on a surface of a phosphor layer opposite to the surface on which the excitation light is incident. The light source device described in JP-A-2011-129354 is configured to take out fluorescence by using reflection by a reflecting surface provided between the phosphor layer and the heat dissipating substrate.

However, in the technique described in Japanese Laid-open Patent Publication No. 2011-129354, it is considered that it is difficult to efficiently dissipate the heat of the phosphor layer caused by the absorption of the excitation light. That is, in the technique described in Japanese Laid-open Patent Publication No. 2011-129354, since most of the excitation light is absorbed on the incident side of the phosphor layer (the side opposite to the heat dissipating substrate of the phosphor layer), and as the excitation light advances (the closer to the heat dissipating substrate), the absorption amount to the phosphor layer decreases, the heat of the phosphor layer increases as much as going away from the heat dissipating substrate. As a result, it is considered that thermal resistance to the heat dissipating substrate is high and the heat dissipation is poor. When the heat generation of the phosphor layer becomes obvious, a phenomenon (temperature quenching) where light emission efficiency decreases as the temperature of the phosphor rises occurs, there is a concern that it is difficult to emit light of high luminance and the joint portion between the phosphor layer and the heat dissipating substrate may deteriorate.

SUMMARY

An advantage of some aspects of the invention is to solve at least a part of the problems described above, and he invention can be implemented as the following forms or application examples.

Application Example 1

A wavelength conversion element according to this application example includes a base material and a phosphor layer that contains a phosphor emitting fluorescence upon incidence of excitation light and is provided on the base material, in which the phosphor layer includes a first surface on which the excitation light is incident and a second surface that faces the base material, and a plurality of regions with different absorption coefficients of the excitation light between the first surface and the second surface.

With this configuration, the wavelength conversion element includes the base material and the phosphor layer, and the phosphor layer includes a plurality of regions with different absorption coefficients of the excitation light. In this way, it possible to efficiently absorb the excitation light in each region as compared with the phosphor layer formed such that the absorption coefficient is substantially uniform and to efficiently transfer the heat of the phosphor layer due to the absorption of the excitation light to the base material, thereby improving the heat dissipation. Therefore, it is possible to provide a wavelength conversion element in which temperature deterioration of the phosphor is suppressed, and the light of the phosphor is efficiently emitted by suppressing a phenomenon (concentration quenching) where the light emission efficiency is lowered by strengthening the mutual action among the particles of the phosphor, or the temperature quenching.

Application Example 2

In the wavelength conversion element according to the application example, it is preferable that the plurality of regions include a first region and a second region provided on the base material side of the first region, and an absorption amount of the excitation light in the second region is larger than an absorption amount of the excitation light in the first region.

With this configuration, the phosphor layer is formed such that the absorption amount of the second region provided at a position closer to the base material than the first region is larger than the absorption amount of the first region. In this way, the heat in the second region which generates heat by absorbing the excitation light much more can be efficiently transferred to the base material. Therefore, since it is possible to efficiently dissipate the heat of the phosphor layer, it is possible to provide a wavelength conversion element in which temperature quenching and temperature deterioration are suppressed.

Application Example 3

In the wavelength conversion element according to the application example, it is preferable that the plurality of regions include a first region and a second region provided on the base material side of the first region, and an absorption amount of the excitation light in the second region is equal to an absorption amount of the excitation light in the first region.

Here, being equal is not limited to being exactly the same but refers to including errors in manufacturing the wavelength conversion element and differences in predetermined errors (for example, errors of ±10%).

With this configuration, the absorption amount of the second region is formed substantially equal to the absorption amount of the first region. In this way, since it possible to make the heat in the first region and the heat in the second region almost equal to each other, it is possible to transfer the heat in the first region and the second region to the base material well and efficiently dissipate the heat of the phosphor layer.

In addition, when the absorption coefficient is small, the light emission amount decreases, and when the absorption coefficient is too large, the concentration quenching occurs. Therefore, it is desirable to form the phosphor layer with an absorption coefficient that the light emission amount is sufficient and the concentration quenching is more suppressed. With this configuration, since the absorption amount in the second region and the absorption amount in the first region are formed to be substantially equal to each other, it is possible to make the absorption coefficients of the first region and the second region closer to the range of a desired absorption coefficient while effectively dissipating the heat of the phosphor layer. Therefore, the wavelength conversion element enables more efficient light emission.

Application Example 4

In the wavelength conversion element according to the application example, the absorption coefficient of the second region is preferably larger than the absorption coefficient of the first region.

With this configuration, since the absorption coefficient of the second region is formed to be larger than the absorption coefficient of the first region, the relationship between the absorption amount of the second region and the absorption amount of the first region as described above can be formed even if the thickness of the second region is formed to be thin compared with the configuration in which the absorption coefficients of the first region and the second region are the same. Therefore, it is possible to further improve the heat dissipation of the phosphor layer by thinning the thickness of the phosphor layer.

Application Example 5

In the wavelength conversion element according to the application example, the base material preferably includes a reflecting portion facing the second surface.

With this configuration, since the above-described reflecting portion is provided, it is possible to provide a wavelength conversion element which exerts the above-described effect by emitting light, which is excited by the excitation light incident from a side of the phosphor layer opposite to the base material, to the excitation light side.

Application Example 6

A wavelength conversion element according to this application example includes a base material and a phosphor layer that contains a phosphor emitting fluorescence upon incidence of excitation light and is provided on the base material, in which the base material is a member through which the excitation light passes, the excitation light is incident on the phosphor layer from the base material side, and the phosphor layer includes a plurality of regions with different absorption coefficients of the excitation light between a surface of the base material side and a surface opposite to the base material.

With this configuration, since the base material transmits the excitation light, it is possible to provide a wavelength conversion element which exerts the above-described effect by emitting light, which is excited by the excitation light incident from a side of the base material opposite to the phosphor layer, to a side of the phosphor layer opposite to the base material.

Application Example 7

In the wavelength conversion element according to the application example, it is preferable that the base material includes a reflecting portion facing the second surface, the plurality of regions include a first region and a second region provided on the base material side of the first region, and the absorption coefficient of the second region is larger than the absorption coefficient of the first region.

With this configuration, since the wavelength conversion element includes the reflecting portion described above, light excited by the excitation light incident from the side of the phosphor layer opposite to the base material, that is, from the first region side toward the second region can be emitted to the excitation light side.

In addition, when the absorption coefficient is large, the light emission efficiency decreases with respect to the excitation light of high light density, but since the first region has a small absorption coefficient, the light emission efficiency is good. In addition, since in the second region having a large absorption coefficient, the excitation light of reduced light density by passing through the first region is incident, and the phosphor in the second region is excited by the excitation light towards the reflecting portion and the excitation light reflected in the reflecting portion, it is possible to have good light emission efficiency in the second region as well. Further, since the light excited by the phosphor layer is emitted from the first region having a small absorption coefficient, the progress is hardly hindered. Therefore, it is possible to provide a wavelength conversion element with enhanced light emission efficiency with respect to excitation light of high light density.

Application Example 8

A light source device according to this application example includes a light emitting portion that emits excitation light and the wavelength conversion element according to any one of the above.

With this configuration, since the light source device includes the above-described wavelength conversion element, it is possible to emit light of high luminance by effectively utilizing the excitation light emitted from the light emitting portion. In addition, since the light source device includes the wavelength conversion element in which temperature deterioration is suppressed, it is possible to extend the life of the light source device.

Application Example 9

A projector according to this application example includes the light source device described above, a light modulation device that modulates light emitted from the light source device, and a projection optical device that projects the light modulated by the light modulation device.

With this configuration, since the projector includes the above-described light source device, it is possible to project a bright image over a long period of time.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
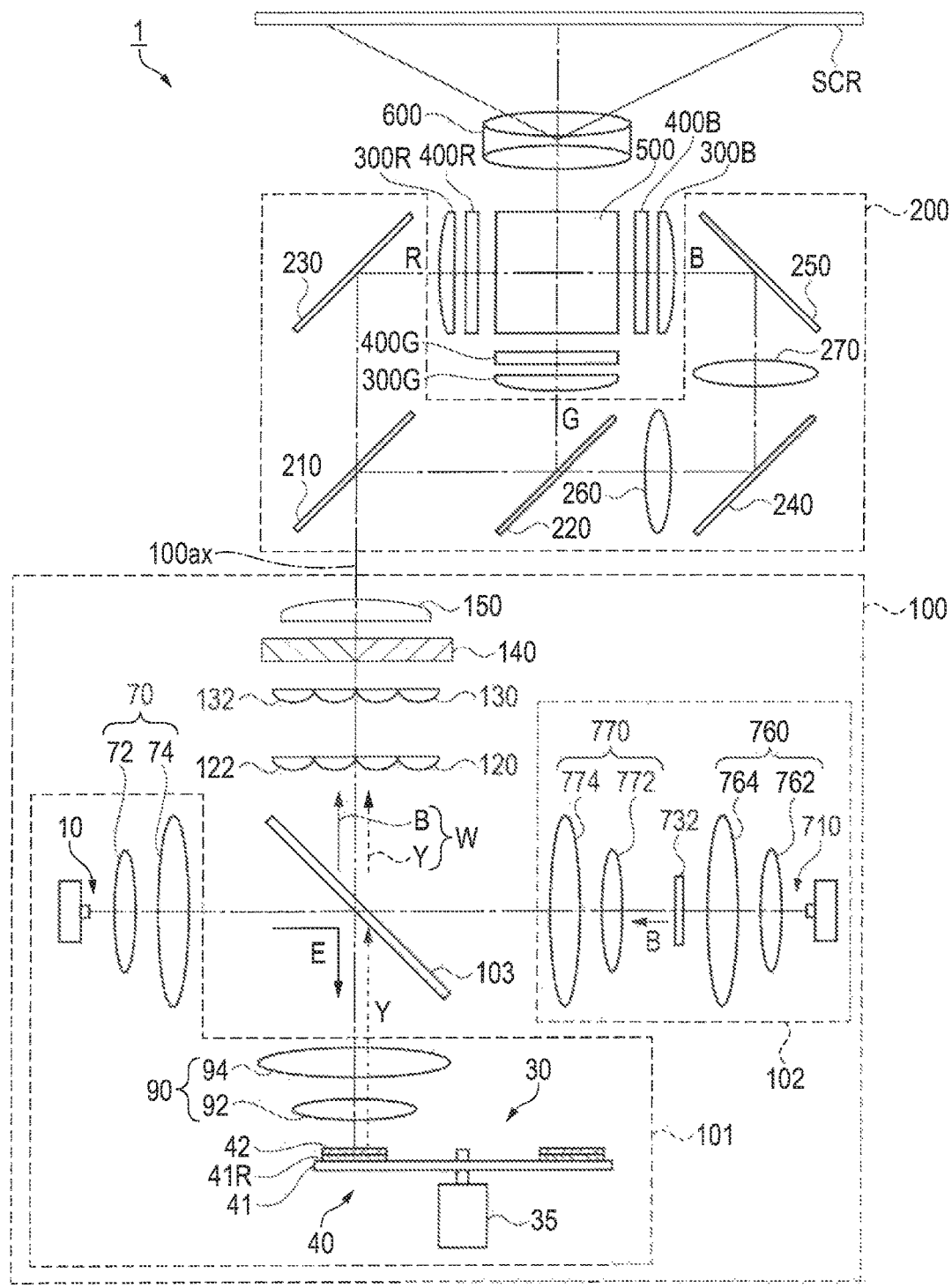
FIG. 1 is a schematic diagram showing an optical system of a projector according to a first embodiment.

Hereinafter, embodiments of the invention will be described with reference to the drawings. In a projector of the present embodiment, light emitted from a light source is modulated according to image information, and an image is projected on a projection surface such as a screen. In each of the diagrams shown below, in order to make respective constituent elements large enough to be recognized on the drawing, the dimensions and ratios of the respective constituent elements are appropriately made different from the actual ones.

First Embodiment

FIG. 1 is a schematic diagram showing an optical system of a projector 1 according to the embodiment.

As shown in FIG. 1, the projector 1 includes a lighting device 100, a color separation light guide optical system 200, light modulation devices 400R, 400G, and 400B, a cross dichroic prism 500, and a projection optical device 600.

The lighting device 100 includes a first light source device 101, a second light source device 102, a dichroic mirror 103, a first lens array 120, a second lens array 130, a polarization conversion element 140, and a superimposing lens 150.

The first light source device 101 includes a first light emitting portion 10, a collimate optical system 70, a collimate light condensing optical system 90, and a wavelength conversion device 30.

The first light emitting portion 10 includes a semiconductor laser and emits blue light E (peak of emission intensity: about 445 nm) as excitation light. The first light emitting portion 10 may be composed of one semiconductor laser or a plurality of semiconductor lasers. In the first light emitting portion 10, it is also possible to use a semiconductor laser which emits blue light with a peak of emission intensity other than 445 nm (for example, 460 nm).

The collimate optical system 70 includes a first lens 72 and a second lens 74 to substantially collimate the light emitted from the first light emitting portion 10.

The dichroic mirror 103 has a function of reflecting the blue light E and passing yellow light Y including red light and green light. The dichroic mirror 103 is disposed at an angle of 45° with respect to the optical axis of the first light emitting portion 10 and reflects the blue light E emitted from the first light emitting portion 10 and passing through the collimate optical system 70.

The collimate light condensing optical system 90 includes a first lens 92 and a second lens 94. The collimate light condensing optical system 90 has a function of condensing the blue light E reflected by the dichroic mirror 103 onto a phosphor layer 42, which will be described later, of the wavelength conversion device 30 and a function of substantially collimating the light emitted from the phosphor layer 42.

The wavelength conversion device 30 includes a wavelength conversion element 40 and a motor 35.

Figure 2:
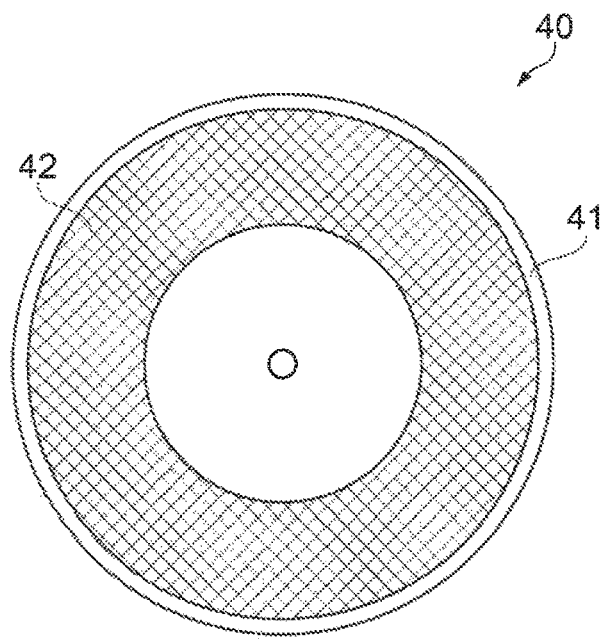
FIG. 2 is a plan diagram of a wavelength conversion element of the first embodiment.

FIG. 2 is a plan diagram of the wavelength conversion element 40.

As shown in FIGS. 1 and 2, the wavelength conversion element 40 includes a base material 41 formed in a disk shape and the phosphor layer 42 provided on one surface side of the base material 41.

The base material 41 is formed of a metal member excellent in heat dissipation such as aluminum or copper, for example, and configured to be rotatable by the motor 35. In addition, in the base material 41, a reflecting portion (a reflecting film 41R) is provided on the side of the collimate light condensing optical system 90. The base material 41 is not limited to being made of metal, but it is also possible to use inorganic materials such as ceramics, for example.

The phosphor layer 42 is formed to contain, for example, (Y, Gd)3(Al, Ga)5O12: Ce which is a YAG-based phosphor, and is layered on the reflecting film 41R in a ring shape. The phosphor layer 42 is excited by the blue light E (the excitation light) condensed by the collimate light condensing optical system 90 and emits the yellow light Y (fluorescence) including red light and green light. The wavelength conversion element 40 reflects the excited yellow light Y to the side of collimate light condensing optical system 90 by the reflecting film 41R. As described above, the wavelength conversion element 40 includes the base material 41 having the reflecting film 41R to be configured as a so-called reflective type.

In addition, as will be described in detail later, the phosphor layer 42 includes a plurality of regions with different Ce concentrations and is configured such that heat dissipation and light emission efficiency get better.

As shown in FIG. 1, the second light source device 102 is disposed on the opposite side of the collimate optical system 70 of the dichroic mirror 103. The second light source device 102 includes a second light emitting portion 710, a condensing optical system 760, a scattering plate 732, and a collimate optical system 770.

The second light emitting portion 710 is configured to have the same semiconductor laser as the first light emitting portion 10 and emits blue light B.

The condensing optical system 760 includes a first lens 762 and a second lens 764 to substantially condense the blue light B emitted from a second light emitting portion 710 to the scattering plate 732.

The scattering plate 732 scatters the incident blue light B so that the blue light B has a light distribution similar to that of the yellow light Y emitted from the wavelength conversion element 40. As the scattering plate 732, for example, frosted glass (optical glass) can be used.

The collimate optical system 770 includes a first lens 772 and a second lens 774 to substantially collimate the light from the scattering plate 732.

The collimated light in the collimate optical system 770 is reflected by the dichroic mirror 103 to the side opposite to the collimate light condensing optical system 90.

The yellow light Y emitted from the first light source device 101 passes through the dichroic mirror 103, is emitted from the second light source device 102, and is synthesized with the blue light B reflected by the dichroic mirror 103, and is emitted to the first lens array 120 as white light W.

The first lens array 120, the second lens array 130, and the superimposing lens 150 constitute an integrator optical system. Specifically, the first lens array 120 includes a plurality of first small lenses 122 for dividing the light from the dichroic mirror 103 into a plurality of partial light fluxes. The plurality of first small lenses 122 are arranged in a matrix in a plane orthogonal to an optical axis 100ax of the lighting device 100.

The second lens array 130 includes a plurality of second small lenses 132 corresponding to the plurality of first small lenses 122 of the first lens array 120. The second lens array 130 forms an image of respective first small lenses 122 of the first lens array 120 in an image forming region of the light modulation devices 400R, 400G, and 400B together with the superimposing lens 150.

The polarization conversion element 140 aligns the random light emitted from the second lens array 130 to substantially one type of polarized light that can be used by the light modulation devices 400R, 400G, and 400B.

The color separation light guide optical system 200 includes dichroic mirrors 210 and 220, reflecting mirrors 230, 240, and 250, and relay lenses 260 and 270. The color separation light guide optical system 200 separates the white light W emitted from the lighting device 100 into red light R, green light G, and blue light B and guides the light to the light modulation devices 400R, 400G, and 400B corresponding to the red light R, the green light G, and the blue light B, respectively. Field lenses 300R, 300G, and 300B are disposed between the color separation light guide optical system 200 and the light modulation devices 400R, 400G, and 400B.

Although not shown in detail, each of the light modulation devices 400R, 400G, and 400B includes a liquid crystal panel, and a polarizing plate on the light incident side and a polarizing plate on the light emitting side respectively disposed on the light incident side and the light emitting side of the liquid crystal panel. Then, the light modulation devices 400R, 400G, and 400B form an image corresponding to each color light beam by modulating the incident color light according to image information.

The cross dichroic prism 500 has a substantially square shape in a plan view bonded with four rectangular prisms and a dielectric multi-layer film is formed on the substantially X-shaped interface where the rectangular prisms are bonded to each other. The cross dichroic prism 500 synthesizes image light of the respective color light beams emitted from the light modulation devices 400R, 400G, and 400B.

The projection optical device 600 includes a plurality of lenses (not shown) to enlarge and project image light synthesized by the cross dichroic prism 500 as a color image on a projection surface SCR such as a screen.

Configuration of Wavelength Conversion Element

Here, the wavelength conversion element 40 will be described in detail.

Figure 3:
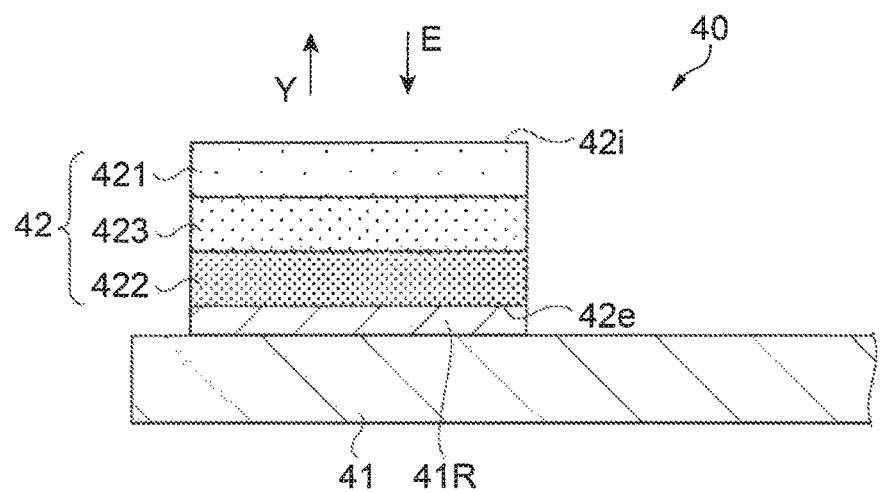
FIG. 3 is a partial cross-sectional diagram of the wavelength conversion element of the first embodiment.

FIG. 3 is a partial cross-sectional diagram of the wavelength conversion element 40, showing an example of a configuration of the phosphor layer 42.

The wavelength conversion element 40 is provided with the phosphor layer 42 on the reflecting film 41R of the base material 41 as described above.

As the phosphor layer 42, it is possible to use a phosphor made bulky or monocrystalline, or phosphor particles bound with inorganic materials (low melting point glass, translucent ceramics, and the like) or translucent resin.

In the embodiment, the phosphor layer 42 is formed in a state where raw material powders with different Ce concentrations are layered, through forming, degreasing, and interring. As shown in FIG. 3, the phosphor layer 42 includes a first surface 42i on which the blue light E (excitation light) is incident and a second surface 42e facing the base material 41 (reflecting film 41R). The phosphor layer 42 includes a plurality of regions with different Ce concentrations between the first surface 42i and the second surface 42e. Specifically, as shown in FIG. 3, the phosphor layer 42 includes a first region 421 provided on the incident side of the blue light E (the excitation light), a second region 422 provided on the base material 41 side of the first region 421, and a third region 423 provided between the first region 421 and the second region 422.

Figure 4:
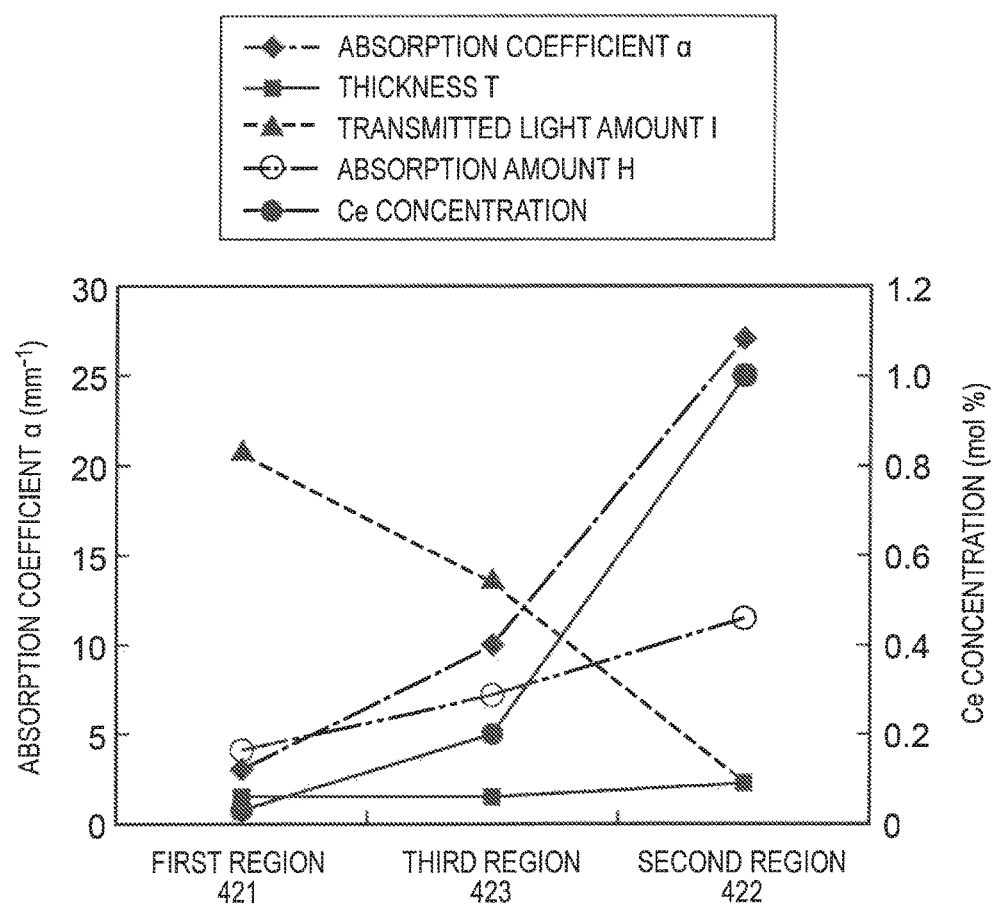
FIG. 4 is a graph showing a Ce concentration, an absorption coefficient, an absorption amount, and a transmitted light amount of excitation light in each region of a phosphor layer of the first embodiment, and a thickness of each region.

FIG. 4 is a graph showing Ce concentration, the absorption coefficient α, the absorption amount H, and the transmitted light amount I of excitation light in each region of the phosphor layer 42, and the thickness T of each region. Specifically, FIG. 4 is a graph showing simulation results based on experimental results obtained by measuring the transmitted light amount I in a sample in which the Ce concentration and the thickness of a layer containing the phosphor are changed, and the absorption coefficient α is calculated by Equation (1).

$$I = I0 \exp(-\alpha x) \quad (1)$$

Here, I0 is the light intensity of the excitation light and x is the thickness of the layer containing the phosphor.

The phosphor layer 42 is formed such that the Ce concentration in each region becomes higher as closer to the base material 41.

Specifically, the phosphor layer 42 is formed such that the Ce concentration is about 0.03 mol % in the first region 421, about 0.2 mol % in the third region 423, and about 1.0 mol % in the second region 422. In addition, the phosphor layer 42 is formed such that the thicknesses T of the first region 421 and the third region 423 are equal, the thickness T of the second region 422 is about 1.5 times the thickness T of the first region 421, and the total thickness is about 210 μm.

As shown in FIG. 4, in the phosphor layer 42, as the absorption coefficient α and the absorption amount H in each region become larger as closer to the base material 41. Specifically, in the phosphor layer 42, the absorption coefficient α in the first region 421 is about 3 mm−1 and the absorption coefficient α in the second region 422 is about 27 mm−1. In addition, the absorption coefficient α increases as the Ce concentration increases, so the Ce concentration and the absorption coefficient α have a positive correlation. The above-described numerical value is an example and is not limited to this numerical value.

As described above, the phosphor layer 42 includes a plurality of regions (first region 421, second region 422, and third region 423) with different absorption coefficients α and is formed such that the absorption coefficient α of the second region 422 provided on the base material 41 side of the first region 421 is larger than the absorption coefficient α of the first region 421.

Figure 5:
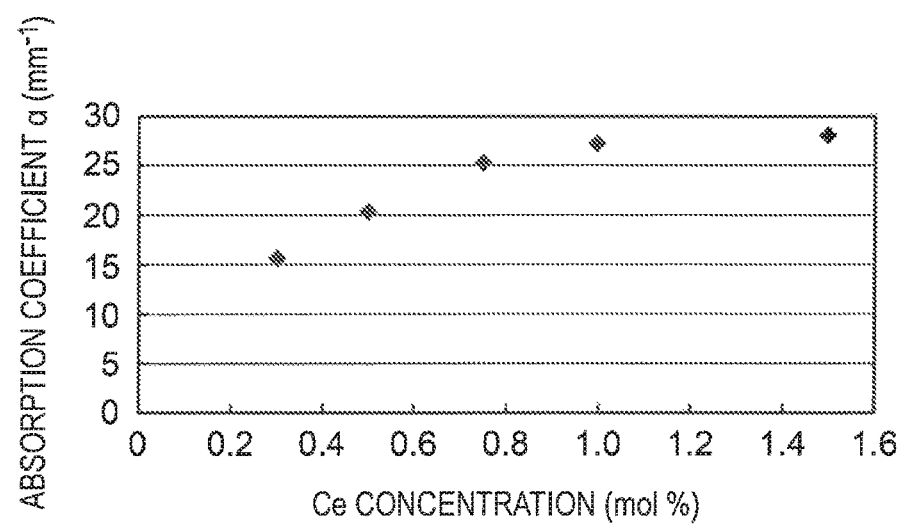
FIG. 5 is a graph showing a relationship between a Ce concentration and the absorption coefficient.
Figure 6:
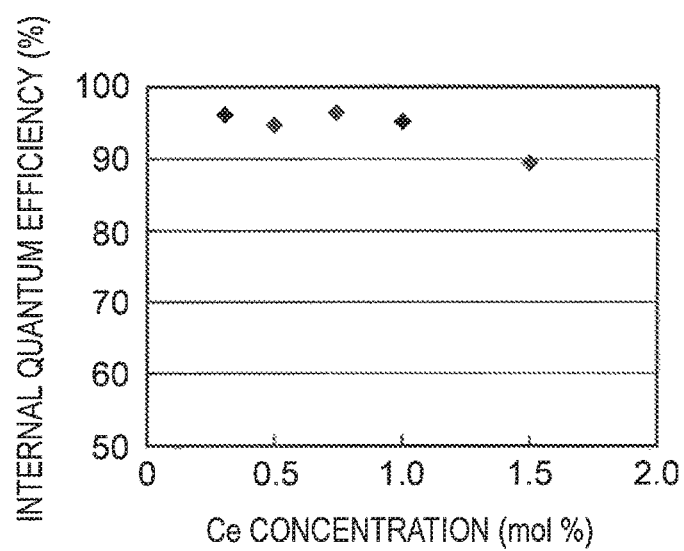
FIG. 6 is a graph showing a relationship between a Ce concentration and internal quantum efficiency.

FIG. 5 is a graph showing a relationship between the Ce concentration and the absorption coefficient α and is a graph obtained using the above-described experimental results and Equation (1). FIG. 6 is a graph showing a relationship between the Ce concentration and the internal quantum efficiency and shows the measurement results obtained by using a measuring instrument.

As shown in FIG. 5, the absorption coefficient α increases as the Ce concentration increases, and increases less when the Ce concentration is 1.0 mol % or more. In addition, as shown in FIG. 6, when the Ce concentration is 1.5 mol %, the internal quantum efficiency decreases distinctly due to concentration quenching. From these results, the Ce concentration used for the phosphor layer 42 is expected to be 1.0 mol % or less.

In addition, as shown in FIG. 4, the phosphor layer 42 is formed such that the absorption amount H in the second region 422 is larger than the absorption amount H in the first region 421, and the absorption amount H increases in a region closer to the base material 41.

Unlike the configuration of the embodiment, in the configuration of the related art in which the Ce concentration is formed substantially uniformly, most of the excitation light incident on the phosphor layer is absorbed most on the incident side and the absorption amount decreases as the excitation light advances (closer to the base material side). In this way, the phosphor layer has larger heat amount as the phosphor layer goes away from the base material and large thermal resistance to the base material.

On the other hand, according to the configuration of the embodiment, since the absorption amount H of the second region 422 closer to the base material 41 among the phosphor layer 42 is larger, the heat amount of the second region 422 becomes larger. That is, thermal resistance to the base material 41 becomes small, so heat dissipation through the base material 41 is good.

Here, the simulation results will be described in comparison with the configuration of the related art, regarding the configuration having the above-described first region 421 and the second region 422 being good in terms of heat dissipation.

Figure 7:
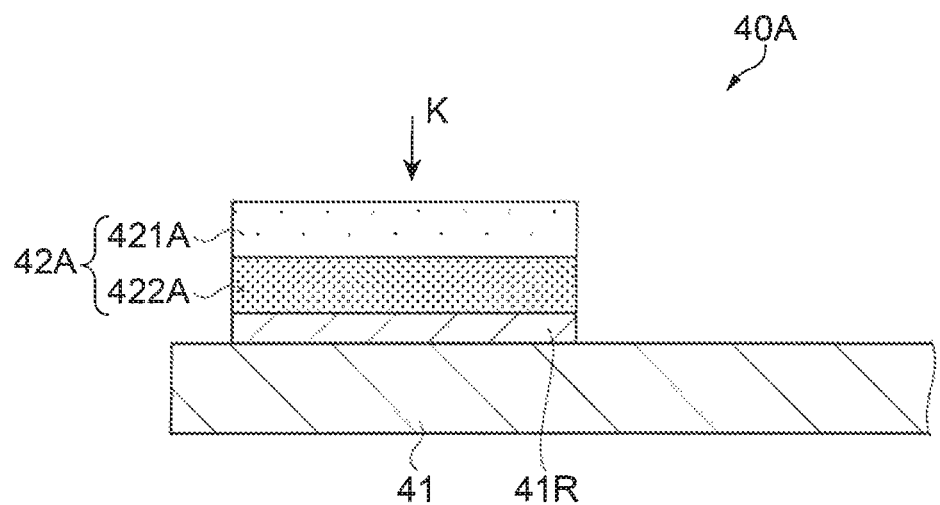
FIG. 7 is a schematic diagram of a model used for simulation.
Figure 8:
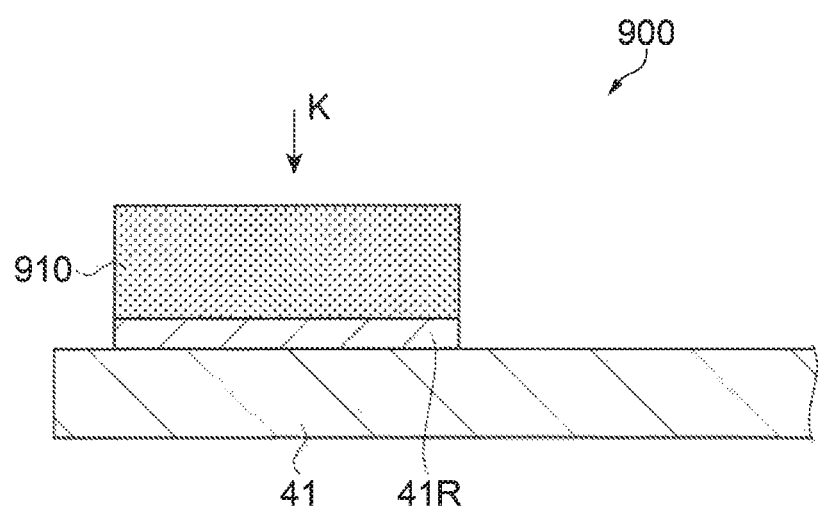
FIG. 8 is a schematic diagram of a model used for simulation.

FIGS. 7 and 8 are schematic diagrams of models used in this simulation. Specifically, FIG. 7 is a partial cross-sectional diagram of a wavelength conversion element 40A including a phosphor layer 42A having two regions with different Ce concentrations (absorption coefficient α) and shows a configuration without the third region 423 in the wavelength conversion element 40 of the embodiment (see FIG. 3). In addition, the wavelength conversion element 40A includes a first region 421A and a second region 422A formed similarly to the first region 421 and the second region 422 in the wavelength conversion element 40. That is, the wavelength conversion element 40A has a Ce concentration of 0.03 mol % (absorption coefficient α is 3 mm−1) in the first region 421A, a Ce concentration of 1.0 mol % (absorption coefficient α is 27 mm−1) in the second region 422A, and has a model in which the absorption amount H in the second region 422A is set to be larger than the absorption amount H in the first region 421A.

FIG. 8 is a partial cross-sectional diagram of a wavelength conversion element 900 in the configuration of the related art, and shows a model including the phosphor layer 910 in which the Ce concentration is uniformly formed at 1.0 mol % (absorption coefficient α is 27 mm−1).

In addition, in the model used in the simulation, in the base material 41, aluminum having a thickness of 1 mm and an outer diameter of 100 mm is used. The phosphor layers 42A and 910 are set in a ring shape having an outer diameter of 65 mm and an inner diameter of 55 mm. Then, the thickness of the phosphor layer 42A and the thickness of the phosphor layer 910 are 200 m, respectively, and in the phosphor layer 42A, the thicknesses of the first region 421A and the second region 422A are set to 100 μm, respectively.

Then, in a case where excitation light K having light density of 20 W/mm$^2$ was irradiated in this model, the following simulation results were obtained. That is, in the wavelength conversion element 900, the surface temperature of the phosphor layer 910 is about 171° C., and in the wavelength conversion element 40A, the surface temperature of the phosphor layer 42A is about 113° C. That is, in the model used for the simulation, a result was obtained that heat dissipation at about 60° C. of the wavelength conversion element 40A has improved than the wavelength conversion element 900. That is, the heat dissipation of the phosphor layer 42A was improved.

The wavelength conversion element 40 of the embodiment has the third region 423 with respect to the model used for simulation, but there is no change in the configuration in which the absorption amount H of the second region 422 located close to the base material 41 is large and the heat dissipation is improved as compared with the configuration of the related art.

As described above, according to the configuration of the embodiment, the following effects can be obtained.

(1) The phosphor layer 42 is formed such that the absorption amount H of the second region 422 provided at a position closer to the base material 41 than the first region 421 is larger than the absorption amount H of the first region 421. In this way, it possible to efficiently transfer the heat of the second region 422 which generates more heat by absorbing the excitation light more to the base material 41. Therefore, since it is possible to dissipate the heat of the phosphor layer 42, it is possible to provide the wavelength conversion element 40 in which temperature quenching or temperature deterioration is suppressed. Accordingly, the wavelength conversion element 40 enables efficient light emission, and for example, discoloration or breakage (especially, deterioration of resin in a configuration where the phosphor is bound with the resin) of the phosphor layer 42, peeling with respect to the base material 41, reduction in reflectance of the reflecting film 41R, and the like are suppressed.

(2) Since the absorption coefficient α of the second region 422 is larger than the absorption coefficient α of the first region 421, even if the thickness of the second region 422 is formed to be thin compared to a configuration in which the absorption coefficients α of the first region 421 and the second region 422 are the same, the absorption amount H of the second region 422 can be larger than the absorption amount H of the first region 421. Therefore, it is possible to improve the heat dissipation of the phosphor layer 42 by making the thickness of the phosphor layer 42 thin.

(3) Since the wavelength conversion element 40 includes the reflecting film 41R provided between the base material 41 and the phosphor layer 42, the light excited by the excitation light incident from the side of the phosphor layer 42 opposite to the base material 41 can be emitted to the side of the excitation light.

(4) Since the first light source device 101 includes the wavelength conversion element 40, it is possible to emit the light of high luminance (yellow light Y) by effectively utilizing the excitation light emitted from the first light emitting portion 10. In addition, since the first light source device 101 includes the wavelength conversion element 40 in which temperature deterioration is suppressed, it is possible to extend the life of the first light source device 101.

(5) Since the projector 1 includes the first light source device 101, it is possible to project a bright image over a long period of time.

Second Embodiment

Hereinafter, a wavelength conversion element 50 according to the second embodiment will be described with reference to the drawings. In the following description, the same reference numerals are given to the same components as those of the first embodiment, and a detailed description thereof will be omitted or simplified.

The wavelength conversion element 50 of the embodiment includes a phosphor layer 52 which is different from the phosphor layer 42 of the wavelength conversion element 40 of the first embodiment.

Figure 9:
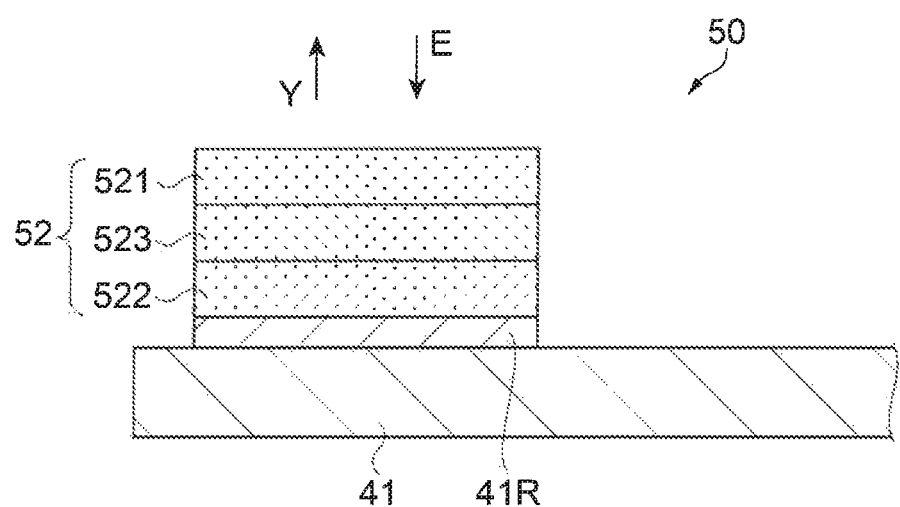
FIG. 9 is a partial cross-sectional diagram of a wavelength conversion element of a second embodiment.
Figure 10:
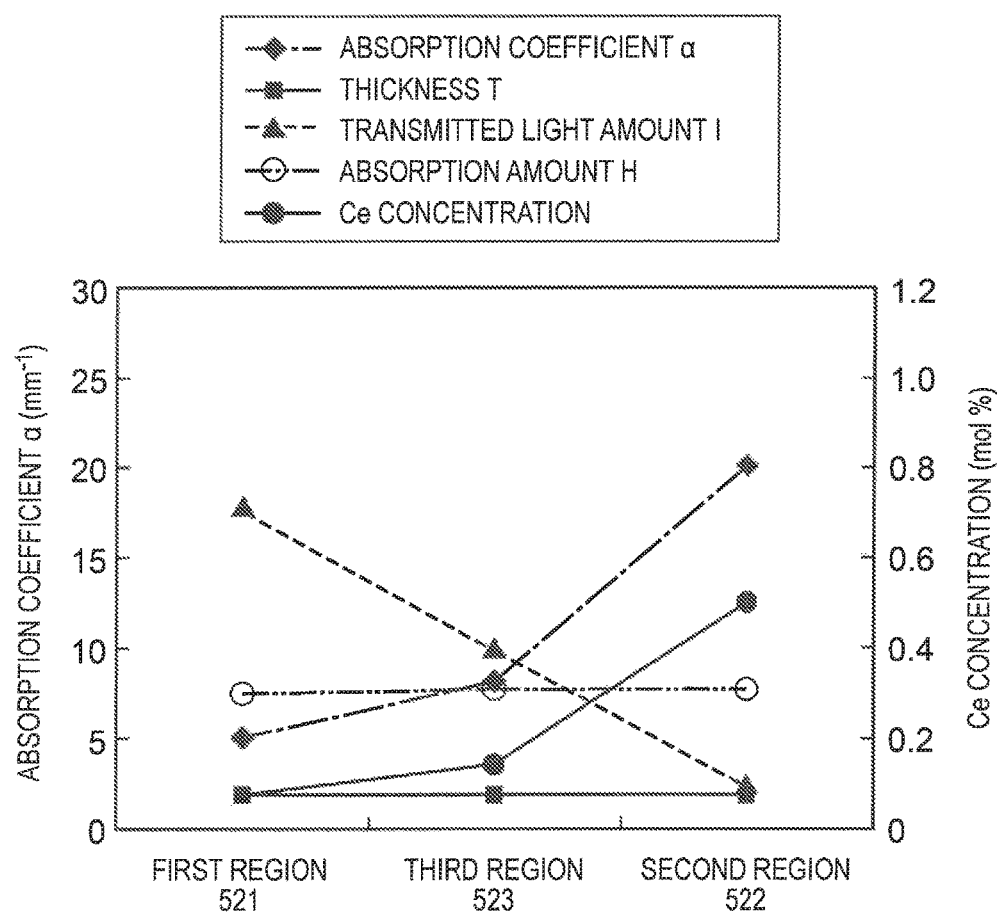
FIG. 10 is a graph showing a Ce concentration, an absorption coefficient, an absorption amount, and a transmitted light amount of excitation light in each region of a phosphor layer of the second embodiment, and a thickness of each region.

FIG. 9 is a partial cross-sectional diagram of the wavelength conversion element 50 of the embodiment. FIG. 10 is a graph showing the Ce concentration, the absorption coefficient α, the absorption amount H, and the transmitted light amount I of the excitation light in each region of the phosphor layer 52, and the thickness T of each region, and is a graph obtained by simulation similarly to the graph shown in FIG. 4.

As shown in FIG. 9, the phosphor layer 52 includes a plurality of regions with different Ce concentrations (absorption coefficient α) similarly to the phosphor layer 42. Specifically, the phosphor layer 52 includes a first region 521 provided on the incident side of the blue light E (excitation light), a second region 522 provided on the base material 41 side of the first region 521, and a third region 523 provided between the first region 521 and the second region 522.

Then, the phosphor layer 42 of the first embodiment is formed such that the absorption amount H in each region becomes larger as closer to the base material 41 (see FIG. 4), but the phosphor layer 52 of the embodiment is formed such that the absorption amount H of the excitation light in each region is equal, that is, substantially the same, as shown in FIG. 10. Then, the phosphor layer 52 is formed such that the absorption amount H of the excitation light in each region is substantially midway between the absorption amount H of the first region 421 and the absorption amount H of the second region 422 in the phosphor layer 42 of the first embodiment. In addition, the phosphor layer 52 is formed such that the thickness T in each region is substantially the same and a total thickness is about 210 μm.

Here, the simulation results will be described in comparison with the configuration of the related art, regarding a configuration having the first region 521 and the second region 522 formed such that the absorption amount H thereof is equal to each other being good in terms of heat dissipation.

Figure 11:
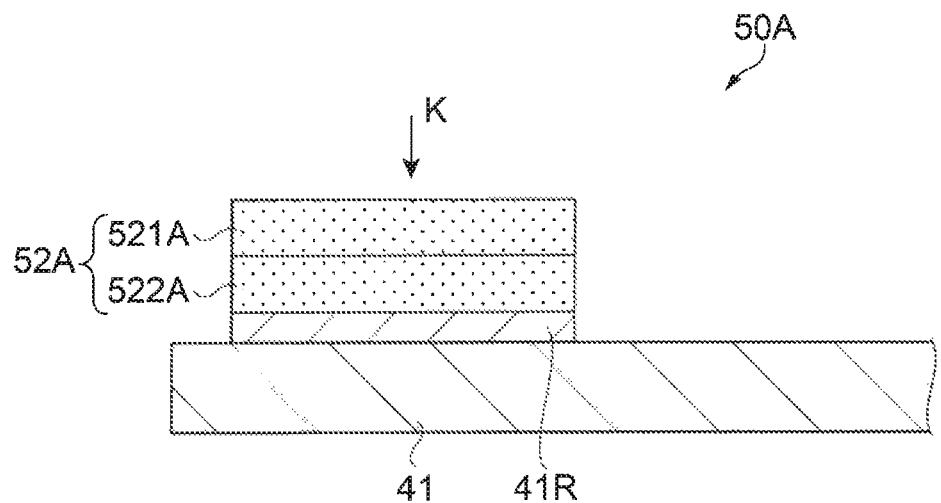
FIG. 11 is a schematic diagram of a model used for simulation.

FIG. 11 is a schematic diagram of a model used in this simulation. Specifically, FIG. 11 is a partial cross-sectional diagram of a wavelength conversion element 50A including a phosphor layer 52A including two regions of a first region 521A and a second region 522A in which the absorption amount H is equal to each other, and shows a configuration without the third region 523 in the wavelength conversion element 50 (see FIG. 9) of the embodiment. In the configuration of the related art, the above-described wavelength conversion element 900 (see FIG. 8) is used. In the phosphor layer 52A, the thicknesses of the first region 521A and the second region 522A are set to 100 μm, respectively. In addition, the material and shape of the base material 41 and the plane size of the phosphor layers 52A and 910 are set similar to the conditions described in the simulation of the first embodiment.

Then, in a case where excitation light K having light density of 20 W/mm$^2$ was irradiated in this model, the following simulation results were obtained. That is, the surface temperature of the phosphor layer 910 in the wavelength conversion element 900 is about 171° C. as described above and the surface temperature of the phosphor layer 52A in the wavelength conversion element 50A is about 116° C. That is, in the model used for the simulation, a result was obtained that the heat dissipation at about 55° C. of the wavelength conversion element 50A has improved than the wavelength conversion element 900.

The wavelength conversion element 50 of the embodiment includes three regions, but since the absorption amount H in each region is equally formed, heat transfer to the base material 41 is good and heat dissipation has improved as compared with the configuration of the related art.

In addition, the phosphor layer 52 (see FIG. 9) is formed such that the Ce concentration in each region becomes higher as closer to the base material 41, similarly to the phosphor layer 42 (see FIG. 3) of the first embodiment. Then, the phosphor layer 52 is formed such that the Ce concentration in the first region 521 is higher and Ce concentration in the second region 522 is lower compared to the Ce concentration in each region in the phosphor layer 42. Specifically, as shown in FIG. 10, the phosphor layer 52 is formed such that the Ce concentration is about 0.07 mol % in the first region 521, about 0.14 mol % in the third region 523, and about 0.5 mol % in the second region 522. In addition, the phosphor layer 52 of the embodiment is formed such that the absorption coefficient α of the first region 521 is larger (absorption coefficient α: about 5 mm−1) and the absorption coefficient α of the second region 522 is smaller (absorption coefficient α: about 20 mm−1) as compared to the phosphor layer 42 of the first embodiment. The above-described numerical value is an example and is not limited to this numerical value.

Since the Ce concentration of the first region 521 is higher than the Ce concentration of the first region 421 in the phosphor layer 42, the light emission amount of the first region 521 becomes larger than the light emission amount of the first region 421.

In addition, the Ce concentration of the second region 422 in the phosphor layer 42 is 1.0 mol % or less as expected. Therefore, concentration quenching is suppressed, but may occur slightly. In contrast, since the Ce concentration of the second region 522 in the phosphor layer 52 is 0.5 mol %, concentration quenching is further suppressed than in the case where the Ce concentration is 1.0 mol %.

As described above, the phosphor layer 52 in the wavelength conversion element 50 of the embodiment is formed within a range in which the Ce concentration is narrower than that in the phosphor layer 42 of the first embodiment, that is, a range in which it is more efficient in terms of the light emission amount and concentration quenching is further suppressed.

As described above, according to the configuration of the embodiment, the following effects can be obtained.

(1) The phosphor layer 52 is formed such that the absorption amount H of the excitation light in each region is substantially equal. In this way, since it is possible to make the heat generation in each region to the same degree, the transfer of heat of the phosphor layer 52 to the base material 41 is good and it is possible to efficiently dissipate the heat of the phosphor layer 52.

(2) Since the Ce concentration of the second region 522 is higher than the Ce concentration of the first region 521, even if the thickness of the second region 522 is made thin compared to the configuration in which the Ce concentrations of the first region 521 and the second region 522 are the same, the absorption amount H of the first region 521 and the absorption amount H of the second region 522 may be made equal to each other. Therefore, it is possible to improve the heat dissipation of the phosphor layer 52 by making the thickness of the phosphor layer 52 thin.

(3) Since the wavelength conversion element 50 is formed in a range in which the Ce concentration in each region in the phosphor layer 52 is more efficient in terms of the light emission amount and concentration quenching is further suppressed, it is possible to more efficiently emit light.

Third Embodiment

Hereinafter, a wavelength conversion element 80 according to the third embodiment will be described with reference to the drawings.

Figure 12:
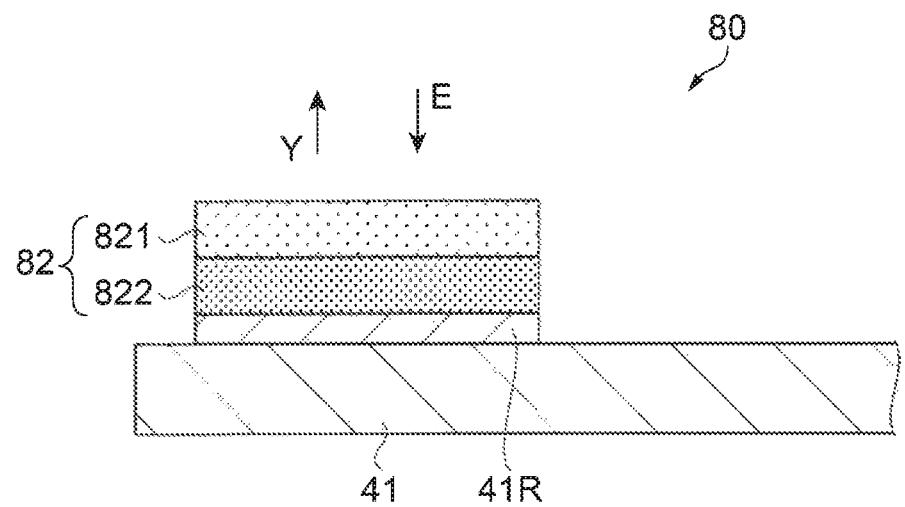
FIG. 12 is a partial cross-sectional diagram of a wavelength conversion element of a third embodiment.

FIG. 12 is a partial cross-sectional diagram of the wavelength conversion element 80 of the embodiment.

As shown in FIG. 12, the wavelength conversion element 80 of the embodiment includes a phosphor layer 82 different from the phosphor layers 42 and 52 shown in the first embodiment and the second embodiment. The wavelength conversion element 80 has the reflecting film 41R provided between the base material 41 and a phosphor layer 82 similarly to the wavelength conversion elements 40 and 50.

The phosphor layer 82 includes a first region 821 and a second region 822 with different Ce concentrations (absorption coefficient α). The first region 821 is provided on the side of the phosphor layer 82 on which the blue light E (excitation light) is incident, and the second region 822 is provided on the base material 41 side of the first region 821. In the phosphor layer 82, the Ce concentration of the second region 822 is higher than the Ce concentration of the first region 821. That is, the phosphor layer 82 is formed such that the absorption coefficient α of the second region 822 is larger than the absorption coefficient α of the first region 821.

Specifically, the phosphor layer 82 of the embodiment is formed such that the Ce concentration is about 0.4 mol % in the first region 821 and the Ce concentration is 0.8 mol % in the second region 822. This numerical value is an example and is not limited to this numerical value. However, when the Ce concentration exceeds 1.0 mol %, the internal quantum efficiency decreases as described above, so it is desirable that the Ce concentration in the second region does not exceed 1.0 mol %.

Figure 13:
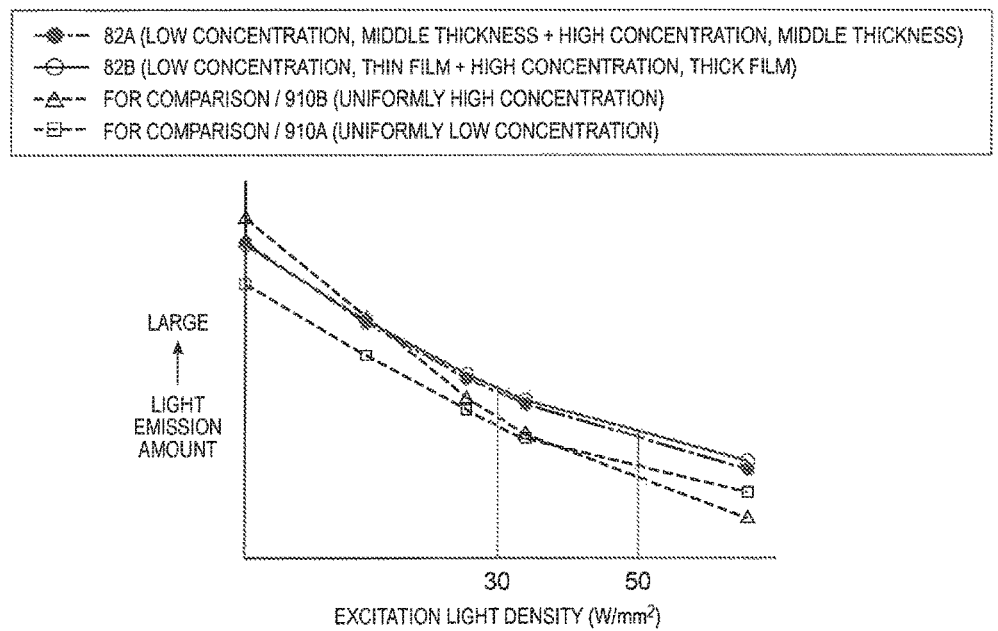
FIG. 13 is a graph showing a relationship between light density of excitation light and light emission amount of the phosphor layer.

FIG. 13 is a graph obtained from experimental results of the relationship between the light density of the excitation light (excitation light density) and the light emission amount of the phosphor layer and is a graph obtained by comparing the wavelength conversion element 80 of the embodiment with the wavelength conversion element 900 (see FIG. 8) of the configuration of the related art.

The wavelength conversion element 900 includes the phosphor layer 910 in which the phosphor particles are substantially uniformly dispersed in a glass binder with a refractive index of substantially 1.5. In addition, FIG. 13 is a graph exemplifying two types of the phosphor layer 82 in which the first region 821 in which the Ce concentration of the phosphor in the glass binder is low and the second region 822 in which the Ce concentration is high have different thicknesses, and two types of the phosphor layer 910 (see FIG. 8) of the wavelength conversion element 900 in which the Ce concentrations are different.

Specifically, as two types of the phosphor layer 82, there are one type in which the thicknesses of the first region 821 and the second region 822 are about 120 μm in each of the glass binders before being dried (indicated as "82A (low concentration, middle concentration+high concentration, middle thickness)" in FIG. 13) and the other type in which the thickness of the first region 821 is about 60 m and the thickness of the second region 822 is about 180 μm (indicated as "82B (low concentration, thin film+high concentration, thick film)" in FIG. 13). On the other hand, as the phosphor layer 910 of the wavelength conversion element 900 of the related art, there are one type in which the Ce concentration is about 0.4 mol % and thickness is about 240 m (indicated as "910A (uniformly low concentration)" in FIG. 13) and the other type in which the Ce concentration is about 0.8 mol % and thickness is about 240 m (indicated as "910B (uniformly high concentration)" in FIG. 13). That is, the four types of phosphor layers (phosphor layers 82A, 82B, 910A, and 910B) are set with the same conditions for thickness.

As shown in FIG. 13, the phosphor layers 82A, 82B, 910A, and 910B have characteristics that the light emission amount decreases as the excitation light density increases. By the way, the projector is expected to project a brighter image, and for example, a light emitting portion which emits the excitation light of about 50 W/mm$^2$ with high excitation light density is used. As shown in FIG. 13, in a case where the excitation light density exceeds 30 W/mm$^2$, the wavelength conversion element 80 (82A and 82B in FIG. 13) of the embodiment has characteristics that the light emission amount is larger than the light emission amount of the wavelength conversion element 900 (910A and 910B in FIG. 13) of the related art. That is, for the excitation light with high light density in which the excitation light density is high, even if the thicknesses of the first region 821 and the second region 822 are different from each other as described above, if the Ce concentration of the second region 822 is higher than the Ce concentration of the first region 821, the light emission amount becomes larger than that of the phosphor layers 910A and 910B in which the Ce concentration is formed substantially uniformly.

The reason why the light emission amount of the wavelength conversion element 80 of the embodiment is larger than the light emission amount of the wavelength conversion element 900 of the related art may be considered as follows.

That is, when a Ce concentration is high (absorption coefficient α is large), light emission efficiency decreases with respect to the excitation light with high light density and when the Ce concentration is low (absorption coefficient α is small), light emission efficiency does not decrease with respect to the excitation light with high light density. Accordingly, the first region 821 on which the excitation light is incident absorbs a part of the excitation light with high light density because the Ce concentration is low, and therefore the light emission efficiency is good. In addition, since the excitation light having a reduced optical density passing through the first region 821 is incident on the second region 822 in which the Ce concentration is high, it is possible to have good light emission efficiency in the second region 822 as well. Further, since the light excited by the phosphor layer 82 is emitted from the first region 821 having a low Ce concentration, it is conceivable that absorption is hardly hindered by Ce. As a result, it is considered that with respect to the excitation light of high light density, the light emission amount of the wavelength conversion element 80 of the embodiment becomes larger than the light emission amount of the wavelength conversion element 900 of the related art in which the Ce concentration is formed substantially uniformly.

As described above, according to the configuration of the embodiment, the following effects may be obtained.

Since the phosphor layer 82 efficiently emits light in the first region 821 and the second region 822 with respect to the excitation light of high light density, it is possible to provide the wavelength conversion element 80 in which light emission efficiency is improved.

The light source device equipped with the wavelength conversion element 80 can emit light of high luminance and the projector equipped with the light source device can project a bright image.

Fourth Embodiment

Hereinafter, a projector 11 according to the fourth embodiment will be described with reference to the drawings.

Figure 14:
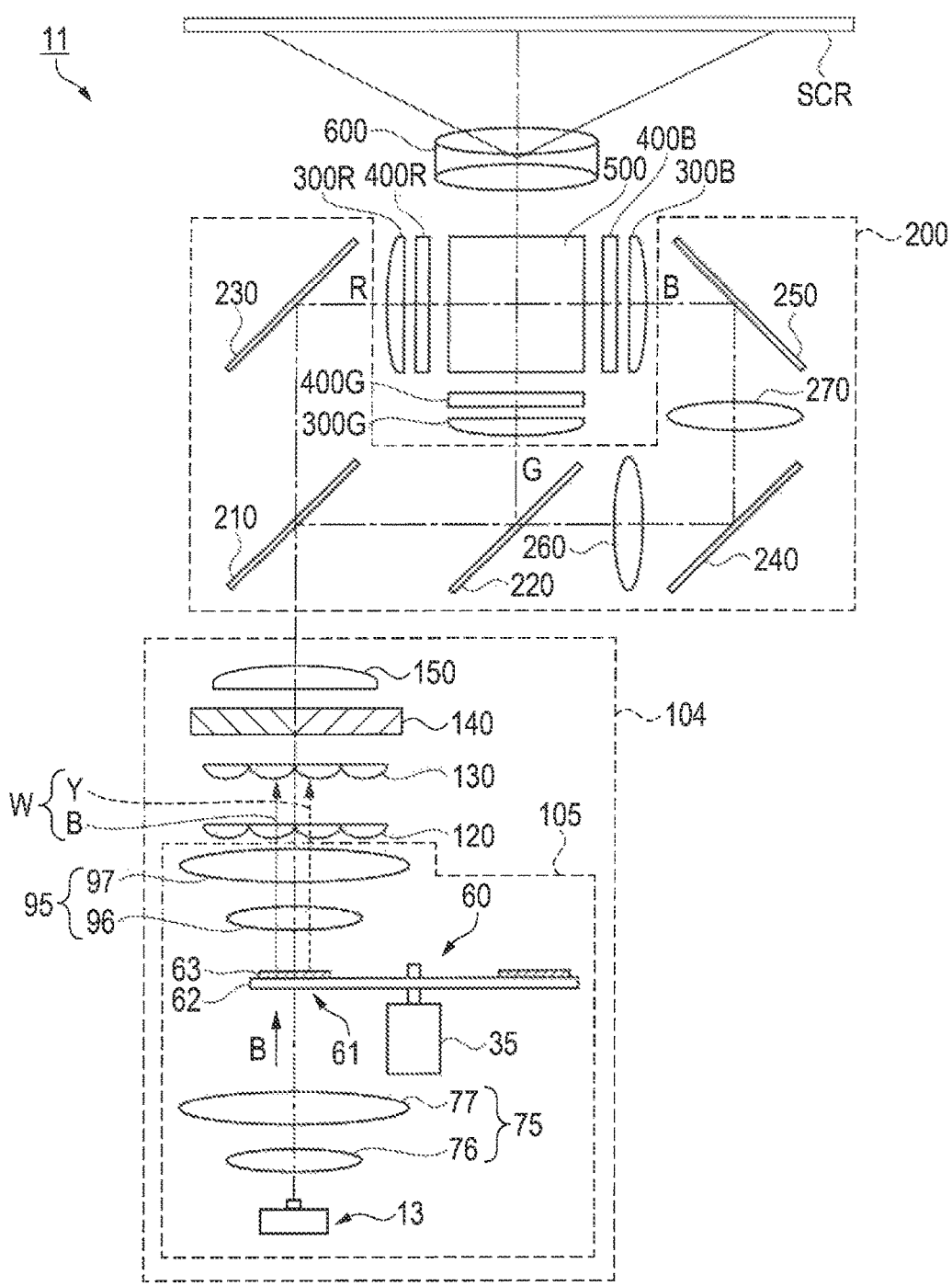
FIG. 14 is a schematic diagram showing an optical system of a projector according to a fourth embodiment.

FIG. 14 is a schematic diagram showing an optical system of the projector 11 according to the embodiment.

The projector 11 of the embodiment includes a lighting device 104 different from a lighting device 100 included in the projector 1 of the first embodiment.

The lighting device 104 includes one light source device 105, as shown in FIG. 14 with respect to a configuration in which the lighting device 100 of the first embodiment includes two light source devices (the first light source device 101, the second light source device 102). In addition, the lighting device 104 includes the first lens array 120, the second lens array 130, the polarization conversion element 140, and the superimposing lens 150 similarly to the lighting device 100 of the first embodiment.

The light source device 105 includes a light emitting portion 13, a condensing optical system 75, a wavelength conversion device 60, and a collimate optical system 95.

The light emitting portion 13 is composed of a semiconductor laser similar to the first light emitting portion 10 of the lighting device 100 and emits blue light B.

The condensing optical system 75 includes a first lens 76 and a second lens 77 to condense the blue light B emitted from the light emitting portion 13 onto a phosphor layer 63 of the wavelength conversion device 60.

The wavelength conversion device 60 includes a wavelength conversion element 61 and the motor 35 that rotates the wavelength conversion element 61.

The wavelength conversion element 61 includes a base material 62 formed in a disk shape and a ring-shaped phosphor layer 63 provided on a surface of the base material 62 opposite to the condensing optical system 75.

The base material 62 is formed of a member through which the blue light B emitted from the light emitting portion 13 is transmitted, for example, quartz glass, quartz, sapphire or the like.

The blue light B emitted from the light emitting portion 13 passes through the base material 62 and is incident on the phosphor layer 63. The phosphor layer 63 transmits a part of the blue light B transmitted through the base material 62 and absorbs the remainder to emit the yellow light Y. That is, the blue light B emitted from the light emitting portion 13 also functions as excitation light. Then, the light emitted from the phosphor layer 63 forms the white light W in which the blue light B and the yellow light Y are synthesized.

As described above, the wavelength conversion element 61 is composed of a so-called transmission type in which the phosphor layer 63 is excited by the excitation light transmitted through the base material 62.

A collimate optical system 95 includes a first lens 96 and a second lens 97 and substantially collimates the white light W emitted from the wavelength conversion element 61.

The white light W emitted from the collimate optical system 95 is incident on the first lens array 120. An optical system after the first lens array 120 is configured similarly to the optical system of the first embodiment.

Figure 15:
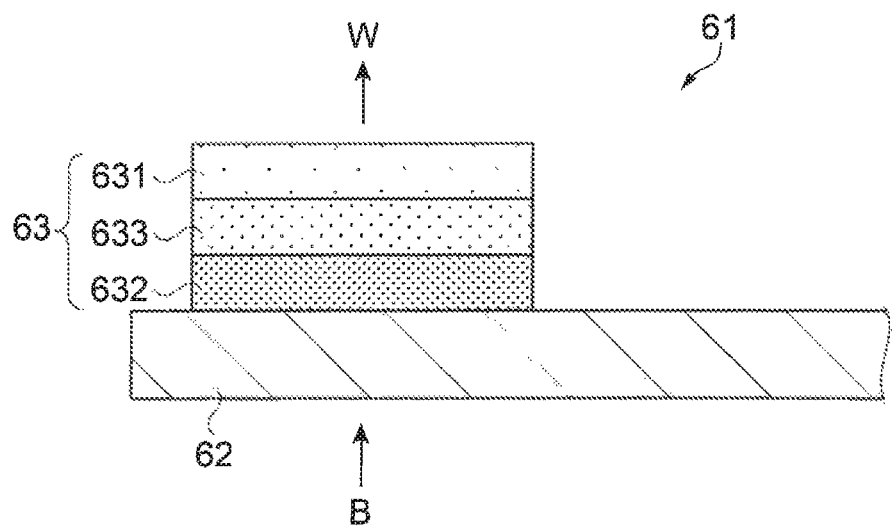
FIG. 15 is a partial cross-sectional diagram of a wavelength conversion element of the fourth embodiment.

Here, the wavelength conversion element 61 will be described in detail. FIG. 15 is a partial cross-sectional diagram of the wavelength conversion element 61.

As shown in FIG. 15, the phosphor layer 63 includes three regions with different Ce concentrations (absorption coefficient α) between the surface on the base material 62 side and the surface on the side opposite to the base material 62. Specifically, the phosphor layer 63 includes a first region 631, a third region 633, and a second region 632 in order from the side opposite to the base material 62, and is formed such that the Ce concentration (absorption coefficient α) in each region becomes higher as closer to the base material 62. That is, the phosphor layer 63 is formed such that the absorption coefficient α of the second region 632 provided on the base material 62 side of the first region 631 is larger than the absorption coefficient α of the first region 631. In addition, the phosphor layer 63 is formed such that the absorption amount H of the second region 632 is larger than the absorption amount H of the first region 631.

As described above, according to the configuration of the embodiment, the following effects can be obtained.

(1) Since the wavelength conversion element 61 is formed by a member in which the base material 62 transmits the excitation light, the light excited by the excitation light incident from the side of the base material 62 opposite to the phosphor layer 63 can be emitted to the side of the phosphor layer 63 opposite to the base material 62.

(2) The phosphor layer 63 is formed such that the absorption amount H of the second region 632 provided at a position closer to the base material 62 than the first region 631 is larger than the absorption amount H of the first region 631. In this way, it possible to efficiently transfer the heat of the second region 632 which generates more heat by absorbing the excitation light much more, to the base material 62. Therefore, since it is possible to efficiently dissipate the heat of the phosphor layer 63, it is possible to provide a wavelength conversion element 61 in which temperature quenching or temperature deterioration is suppressed.

(3) Since the absorption coefficient α of the second region 632 is larger than the absorption coefficient α of the first region 631, even if the thickness of the second region 632 is formed to be thinner compared to the configuration in which the absorption coefficients α of the first region 631 and the second region 632 are the same, the absorption amount H of the second region 632 can be greater than the absorption amount H of the first region 631. Therefore, it is possible to improve the heat dissipation of the phosphor layer 63 by making the thickness of the phosphor layer 63 thin.

The invention is not limited to the above-described embodiment, and various modifications and improvements can be added to the above-described embodiment. A modification example will be described below.

Modification Example 1

In the above embodiments, configurations having three regions and two regions as a plurality of regions with different Ce concentrations (absorption coefficient $\alpha$) have been exemplified, but a configuration may have four or more regions as long as the configuration has the above-described first region and second region. For example, as a configuration having four regions, a configuration in which a fourth region different from the third region is provided between the first region and the second region or a configuration in which a fourth region is provided between the second region and the base material can be exemplified. In addition, in this configuration, the absorption coefficient $\alpha$ of the fourth region may be larger or smaller than the absorption coefficient $\alpha$ of the second region.

Further, the phosphor layer may be configured with three or more regions such that the first region and the second region are configured to be adjacent to each other and another region is provided between the second region and the base material. In this configuration, the absorption coefficient $\alpha$ of the other region may be larger or smaller than the absorption coefficient $\alpha$ of the second region.

In addition, the plurality of regions provided in the phosphor layer are not limited to a configuration in which the absorption coefficients $\alpha$ are different in step by step and a configuration in which the absorption coefficients $\alpha$ continuously change may be used.

Modification Example 2

In the above embodiments, the absorption coefficient $\alpha$ of respective regions are made different by changing the Ce concentrations. However, a configuration in which the absorption coefficients $\alpha$ of respective regions are made different by changing the concentration of the phosphor other than the Ce concentration may be used, for example.

Modification Example 3

Figure 16:
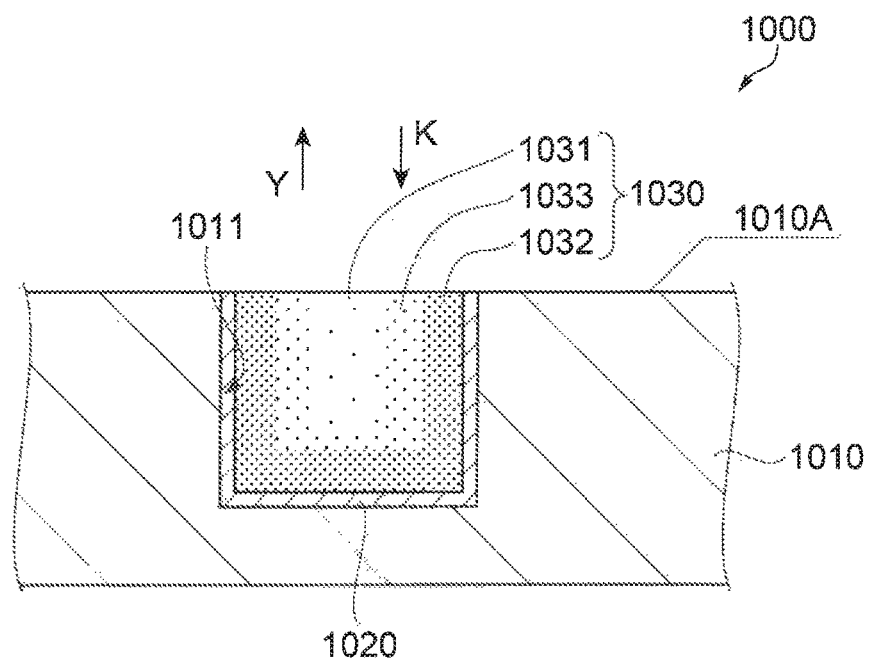
FIG. 16 is a partial cross-sectional diagram of a wavelength conversion element of a modification example.

FIG. 16 is a partial cross-sectional diagram of a wavelength conversion element 1000 of a modification example.

As shown in FIG. 16, the wavelength conversion element 1000 includes a base material 1010 having a recess 1011 on a surface 1010A on the side on which the excitation light K is incident, a reflecting film 1020 formed along the inner surface of the recess 1011, a phosphor layer 1030 provided inside the reflecting film 1020 so as to fill the recess 1011.

The phosphor layer 1030 includes a plurality of regions with different absorption coefficients $\alpha$ along the direction going away from the side close to the reflecting film 1020 to the reflecting film 1020. Specifically, the phosphor layer 1030 includes a first region 1031 farthest from the reflecting film 1020, a second region 1032 closest to the reflecting film 1020, and a third region 1033 provided between the first region 1031 and the second region 1032. Then, the phosphor layer 1030 is formed such that the absorption coefficient $\alpha$ becomes larger in a region closer to the reflecting film 1020, that is, in a region closer to the base material 1010. In addition, the phosphor layer 1030 is formed such that the absorption amount H increases in a region closer to the base material 1010.

As shown in FIG. 16, the excitation light K is incident on the phosphor layer 1030 from the surface 1010A side. The excitation light K is incident on each region at a part close to the surface 1010A of the phosphor layer 1030, and the excitation light K is incident on the first region 1031, the third region 1033, and the second region 1032 in order at a part close to the bottom surface of the recess 1011. Then, the yellow light Y is emitted from the phosphor layer 1030 due to scattering of light at the reflecting film 1020 formed on the bottom surface of the recess 1011 and reflection by the reflecting film 1020 formed on the side surface of the recess 1011.

As described above, since the wavelength conversion element 1000 is formed such that the phosphor layer 1030 is provided in the recess 1011 of the base material 1010 and the absorption amount H increases in a region closer to the base material 1010, it is possible to efficiently transfer the heat generated by absorption of the excitation light K to the base material 1010 from the side surface portion in addition to the bottom surface portion of the recess 1011. Therefore, the wavelength conversion element 1000 further improves heat dissipation.

Modification Example 4

Figure 17:
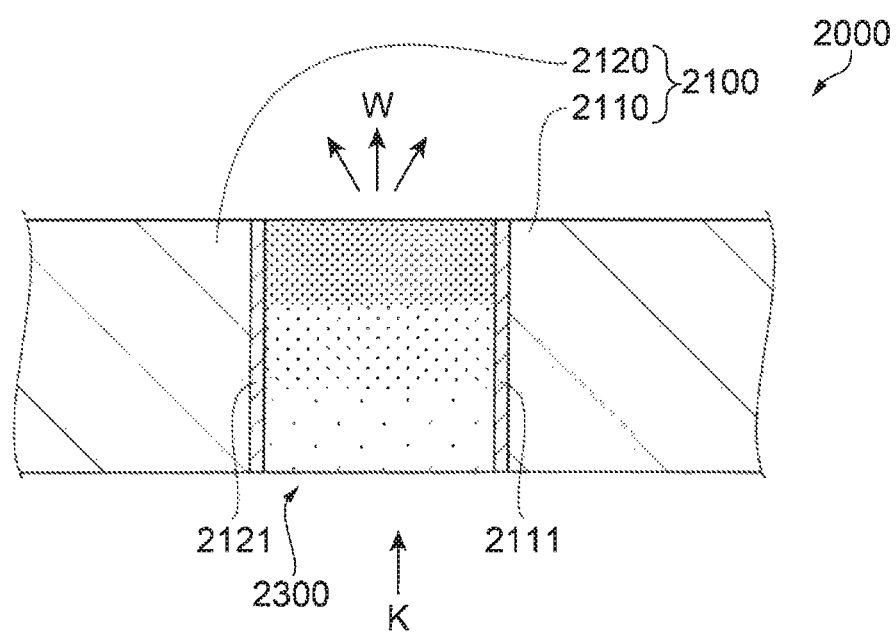
FIG. 17 is a partial cross-sectional diagram of the wavelength conversion element of the modification example.

FIG. 17 is a partial cross-sectional diagram of a wavelength conversion element 2000 of another modification example.

As shown in FIG. 17, the wavelength conversion element 2000 includes a base material 2100 and a phosphor layer 2300. The base material 2100 includes a first base material 2110 in a disk shape and a second base material 2120 having an inner diameter larger than the outer diameter of the first base material 2110. Then, the reflecting film 2111 is formed on the outer circumferential surface of the first base material 2110, and a reflecting film 2121 is formed on the inner circumferential surface of the second base material 2120. The phosphor layer 2300 is provided between the reflecting film 2111 formed on the first base material 2110 and the reflecting film 2121 formed on the second base material 2120. The excitation light K (blue light) is incident on the phosphor layer 2300 from one surface side of the base material 2100. The phosphor layer 2300 includes a plurality of regions with different absorption coefficients $\alpha$ along the advancing direction of the excitation light. In addition, the plurality of regions include at least two regions formed with the equal absorption amount H.

With this configuration, since the heat generated by absorbing the excitation light is efficiently transferred to the base material 2100, the wavelength conversion element 2000 efficiently dissipates the heat.

Modification Example 5

The base material 41 of the embodiment is formed in a disk shape, but is not limited to a disk shape, and may be in, for example, a polygonal shape. In addition, in the embodiment, the base material 41 is configured to be rotated, but may be configured not to rotate.

Modification Example 6

In the projector of the embodiment, a transmissive liquid crystal panel is used as a light modulation device, but a reflective liquid crystal panel may be used. In addition, a light modulation device of micro-mirror type, for example, a Digital Micro-mirror Device (DMD) or the like may be used as a light modulation device.

Modification Example 7

The light modulation device of the embodiment employs a so-called three-plate system using three light modulation devices 400R, 400G, and 400B corresponding to light R, light G, and light B, but the invention is not limited thereto. A single plate system may be employed or the invention can be applied to a projector including two or four or more light modulation devices.

The entire disclosure of Japanese Patent Application No. 2016-161583, filed on Aug. 20, 2016 is expressly incorporated by reference herein.

What is claimed is:

1. A wavelength conversion element comprising:
a base material; and
a phosphor layer that contains a phosphor emitting fluorescence upon incidence of excitation light and is provided on the base material,
wherein the phosphor layer includes a first surface on which the excitation light is incident and a second surface facing the base material, and a plurality of regions with different absorption coefficients of the excitation light between the first surface and the second surface,
wherein the plurality of regions include a first region and a second region provided on the base material side of the first region, and
an absorption amount of the excitation light in the second region is larger than an absorption amount of the excitation light in the first region.

2. The wavelength conversion element according to claim 1,
wherein the absorption coefficient of the second region is larger than the absorption coefficient of the first region.

3. The wavelength conversion element according to claim 1,
wherein the base material includes a reflecting portion facing the second surface.

4. A light source device comprising:
a light emitting portion that emits excitation light; and
the wavelength conversion element according to claim 1.

5. A projector comprising:
the light source device according to claim 4;
a light modulation device that modulates the light emitted from the light source device; and
a projection optical device that projects the light modulated by the light modulation device.

6. A wavelength conversion element comprising:
a base material; and
a phosphor layer that contains a phosphor emitting fluorescence upon incidence of excitation light and is provided on the base material,
wherein the phosphor layer includes a first surface on which the excitation light is incident and a second surface facing the base material, and a plurality of regions with different absorption coefficients of the excitation light between the first surface and the second surface,
wherein the plurality of regions include a first region and a second region provided on the base material side of the first region, and
an absorption amount of the excitation light in the second region is equal to an absorption amount of the excitation light in the first region.

7. The wavelength conversion element according to claim 6,
wherein the absorption coefficient of the second region is larger than the absorption coefficient of the first region.

8. A light source device comprising:
a light emitting portion that emits excitation light; and
the wavelength conversion element according to claim 6.

9. A projector comprising:
the light source device according to claim 8;
a light modulation device that modulates the light emitted from the light source device; and
a projection optical device that projects the light modulated by the light modulation device.

10. A wavelength conversion element comprising:
a base material; and
a phosphor layer that contains a phosphor emitting fluorescence upon incidence of excitation light and is provided on the base material,
wherein the phosphor layer includes a first surface on which the excitation light is incident and a second surface facing the base material, and a plurality of regions with different absorption coefficients of the excitation light between the first surface and the second surface,
wherein the base material includes a reflecting portion facing the second surface,
the plurality of regions include a first region and a second region provided on the base material side of the first region, and
the absorption coefficient of the second region is larger than the absorption coefficient of the first region.

11. A light source device comprising:
a light emitting portion that emits excitation light; and
the wavelength conversion element according to claim 10.

12. A projector comprising:
the light source device according to claim 11;
a light modulation device that modulates the light emitted from the light source device; and
a projection optical device that projects the light modulated by the light modulation device.

13. A wavelength conversion element comprising:
a base material; and
a phosphor layer that contains a phosphor emitting fluorescence upon incidence of excitation light and is provided on the base material,
wherein the base material is a member through which the excitation light passes,
the excitation light is incident on the phosphor layer from the base material side,
the phosphor layer includes a plurality of regions with different absorption coefficients of the excitation light between a surface of the base material side and a surface opposite to the base material,
wherein the plurality of regions include a first region and a second region provided on the base material side of the first region, and
an absorption amount of the excitation light in the second region is larger than an absorption amount of the excitation light in the first region.

14. The wavelength conversion element according to claim 13,
wherein the absorption coefficient of the second region is larger than the absorption coefficient of the first region.

15. A light source device comprising:

a light emitting portion that emits excitation light; and the wavelength conversion element according to claim 13.

16. A projector comprising:

the light source device according to claim 15;

a light modulation device that modulates the light emitted from the light source device; and a projection optical device that projects the light modulated by the light modulation device.

17. A wavelength conversion element comprising:

a base material; and a phosphor layer that contains a phosphor emitting fluorescence upon incidence of excitation light and is provided on the base material, wherein the base material is a member through which the excitation light passes, the excitation light is incident on the phosphor layer from the base material side, the phosphor layer includes a plurality of regions with different absorption coefficients of the excitation light between a surface of the base material side and a surface opposite to the base material, wherein the plurality of regions include a first region and a second region provided on the base material side of the first region, and the absorption coefficient of the second region is larger than the absorption coefficient of the first region.

18. A light source device comprising:

a light emitting portion that emits excitation light; and the wavelength conversion element according to claim 17.

19. A projector comprising:

the light source device according to claim 18;

a light modulation device that modulates the light emitted from the light source device; and a projection optical device that projects the light modulated by the light modulation device.

\* \* \* \* \*